(12) United States Patent
Vitalini et al.

(10) Patent No.: US 10,227,179 B2
(45) Date of Patent: Mar. 12, 2019

(54) CONVEYOR CHUTE COMPRISING A WIDTH ADJUSTING MECHANISM

(71) Applicant: SIEMENS AKTIENGESELLSCHAFT, Munich (DE)

(72) Inventors: Michele Vitalini, Nuremberg (DE); Juergen Braun, Stockach-Zizenhausen (DE); Christoph Hofmann, Salem-Neufrach (DE); Oliver Schitthelm, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/576,332

(22) PCT Filed: May 12, 2016

(86) PCT No.: PCT/EP2016/060648
§ 371 (c)(1),
(2) Date: Nov. 22, 2017

(87) PCT Pub. No.: WO2016/192945
PCT Pub. Date: Dec. 8, 2016

(65) Prior Publication Data
US 2018/0162644 A1 Jun. 14, 2018

(30) Foreign Application Priority Data
Jun. 4, 2015 (DE) .......................... 10 2015 210 344

(51) Int. Cl.
*B65G 11/08* (2006.01)
*B65G 11/20* (2006.01)
(Continued)

(52) U.S. Cl.
CPC .......... *B65G 11/203* (2013.01); *B65G 11/081* (2013.01); *B65G 47/53* (2013.01);
(Continued)

(58) Field of Classification Search
CPC .... B65G 11/203; B65G 47/53; B65G 47/715; B65G 13/08; B65G 2201/0238; B65G 11/20; B65G 11/206; B65G 13/10
See application file for complete search history.

(56) References Cited

U.S. PATENT DOCUMENTS 3,550,756 A 12/1970 Kornylak
4,088,213 A * 5/1978 Nakamura ............ B21B 39/004
188/164
(Continued)

FOREIGN PATENT DOCUMENTS

DE 800288 C 10/1950
DE 102004049560 A1 4/2006
(Continued)

OTHER PUBLICATIONS

"Description JP2001315928: Patent Translate" EPO and Google. (Year: 2018).*

*Primary Examiner* — Mark A Deuble
(74) *Attorney, Agent, or Firm* — Laurence Greenberg; Werner Stemer; Ralph Locher

(57) ABSTRACT

A conveyor chute is suitable for use as a store for goods, such as packages and pieces of luggage. The conveyor chute has at least one sliding section with an inclined sliding surface with a direction of fall along the sliding surface as well as a sliding width. The sliding section has a width adjusting mechanism which allows the goods to be distributed across at least part of the sliding width and which thus allows the conveyor chute to be used in an improved manner for storing the goods.

14 Claims, 6 Drawing Sheets

(51) Int. Cl.
*B65G 47/53* (2006.01)
*B65G 47/71* (2006.01)
B65G 13/08 (2006.01)
B65G 13/10 (2006.01)

(52) U.S. Cl.
CPC ............ *B65G 47/715* (2013.01); *B65G 13/08* (2013.01); *B65G 13/10* (2013.01); *B65G 2201/0238* (2013.01)

(56) References Cited

U.S. PATENT DOCUMENTS

| | | | |
|---|---|---|---|
| 5,333,722 A | 8/1994 | Ouellette | |
| 6,276,508 B1 * | 8/2001 | Bonnet | B07C 5/362 |
| | | | 198/348 |
| 7,134,460 B2 | 11/2006 | Kaplan et al. | |
| 2007/0221471 A1 | 9/2007 | Fourney et al. | |
| 2009/0020391 A1 * | 1/2009 | McKeough | B65G 11/166 |
| | | | 193/25 B |
| 2011/0222972 A1 * | 9/2011 | Erceg | B65G 11/123 |
| | | | 406/86 |
| 2013/0192954 A1 | 8/2013 | Fourney | |
| 2013/0256090 A1 * | 10/2013 | Heitplatz | B65G 11/203 |
| | | | 193/2 R |
| 2017/0121124 A1 * | 5/2017 | Wilkins | B65G 39/025 |
| 2017/0320677 A1 * | 11/2017 | Wiehler | B65G 47/715 |
| 2017/0334648 A1 * | 11/2017 | Hartmann | B65G 11/203 |

FOREIGN PATENT DOCUMENTS

| | | | | |
|---|---|---|---|---|
| EP | 1947035 A1 | 7/2008 | | |
| JP | 58113041 A * | 7/1983 | ........... | B65G 11/206 |
| JP | 2001315928 A | 11/2001 | | |
| WO | 2014012861 A1 | 1/2014 | | |

* cited by examiner

CONVEYOR CHUTE COMPRISING A WIDTH ADJUSTING MECHANISM

BACKGROUND OF THE INVENTION

Field of the Invention

The invention relates to the technical field of conveyor chutes for goods, for instance for packages and pieces of luggage.

Conveyor chutes are often used for unloading from automated sorting processes in sorting systems (sorters), such as in package sorting systems or baggage conveying and sorting systems in airports for instance. Accordingly conveyor chutes are frequently terminals of a sorting process and serve at the same time as a store so that removal does not have to take place instantly at the point of unloading.

The increase in online ordering of products has resulted in a continuous rise in package and parcel volumes, as a result of which advantageous embodiments of conveyor chutes have a large potential primarily in package sorting systems. If the conveyor chute is required to be used as a store, utilization of the entire sliding length and sliding width is advantageous. Prior to unloading into the conveyor chute, the goods often have high speeds and a direction of movement which in most cases does not match with a direction of fall along the conveyor chute. Since upon unloading the goods are not completely stopped, on account of their inertia they collect on one side of the conveyor chute, a collection side. The collection side is located in most cases in the direction of movement of the goods prior to unloading. The side of the conveyor chute which faces the collection side is thus utilized less completely for storage purposes.

Current prior art involves using deflector sheets at a sliding edge on the collection side, which gives impetus to the goods away from the collection side in the event of impact. Alternatively, the conveyor chute is inclined at a slight angle in order to utilize the gravitational force. Both solutions only result however in a slightly improved, but insufficiently uniform distribution of the goods along the sliding width, so that a further solution is required.

SUMMARY OF THE INVENTION

The object underlying the present invention is therefore to achieve an improved utilization of a conveyor chute for storing goods. This object is achieved by the solutions described in the independent claims.

According to one aspect, a conveyor chute is presented, which is suitable for use as a store of goods, in particular of packages and pieces of luggage. The conveyor chute comprises at least one sliding section 6, which has an inclined sliding surface with a direction of fall along the sliding surface. The conveyor chute has a sliding width. The sliding section comprises a width distribution apparatus, with which the goods can be distributed across at least one part of the sliding width and which thus enables an improved utilization of the conveyor chute for storing goods. As a result, the improved utilization of the conveyor chute for storage purposes is permitted without increasing the surface requirement.

According to one exemplary embodiment, the width distribution apparatus is integrated into the sliding surface. As a result, the goods can pass through the sliding surface as normal.

According to a further exemplary embodiment, the width distribution apparatus comprises at least one drive means for conveying the goods. The drive means is arranged such that the drive means has a direction of transport which does not match with the direction of fall. As a result, the goods can be moved not only in the direction of fall, but also in the direction of transport.

According to a further exemplary embodiment, the width distribution apparatus does not cover the entire surface of the sliding section, in particular not the entire width of the sliding chute. As a result, a deflection of the goods from the direction of fall in the direction of transport can only be intentionally achieved in one specific area of the sliding section, while goods in another area continue to be moved in the direction of fall.

According to a further exemplary embodiment, the at least one drive means is distributed across a number of sections, which are arranged offset along the sliding width. As a result, a deflection of the goods can be intentionally achieved on different areas along the sliding width. As a result goods with different dimensions, different speeds, experience different deflections and the probability of goods being distributed across the available sliding surface is increased.

According to a further exemplary embodiment, the at least one drive means is distributed across a number of sections, which are arranged along the direction of fall. As a result, the goods can be deflected repeatedly when passing through the sliding section.

According to a further exemplary embodiment, a number of sections of the at least one drive means has different directions of transport. As a result, the direction of transport to be achieved can be varied at different points on the sliding section.

According to a further exemplary embodiment, the width distribution apparatus comprises an unloading apparatus. The unloading apparatus brings the goods to different positions along the sliding width at the upper end of the sliding section. As a result, a width distribution of the goods is already achieved in the upper area of the sliding section.

According to a further exemplary embodiment, the width distribution apparatus comprises a distribution apparatus arranged in the upper area of the sliding section. The distribution apparatus permits goods to be distributed onto a right side and/or left side of the sliding section. The goods are therefore already distributed in the upper area of the sliding section along the sliding width.

According to a further exemplary embodiment, the drive means is designed to transport the goods actively and/or by way of drop delivery. This permits a wide use of different drive means. The drop delivery uses the weight force of the goods, as a result of which a particularly simple, energy-efficient and low-maintenance construction is permitted.

According to a further exemplary embodiment, the drive means comprises a roller conveyor and/or a conveyor belt. As a result, the relevant drive means can be selected depending on the field of application of the conveyor chute and/or length of the sections of the drive means.

According to a further aspect, a method is presented for storing goods on a conveyor chute. The conveyor chute comprises a sliding section which has an inclined sliding surface with a direction of fall along the sliding surface. The conveyor chute has a sliding width. The sliding section comprises a width distribution apparatus. The goods can be distributed across at least one part of the sliding width using the width distribution apparatus. The method comprises the method step of unloading the goods in an unloading area of the sliding section. The goods would accumulate on a collection side of the sliding section without the influence from the width distribution apparatus. The goods are distributed by means of interaction between the goods and the width distribution apparatus. By using the method, the goods can cover the paths along the sliding section which are influenced by the width distribution apparatus.

According to a further exemplary embodiment, prior to unloading, the goods do not have a direction of movement which matches with the direction of fall. As a result, the goods cover the paths along the sliding section, which can be influenced both by the direction of movement and also by the direction of fall.

According to a further exemplary embodiment, the goods are collected on the collection side on account of their inertia and their direction of movement prior to unloading. The inertia and/or the direction of movement of the goods also influences the path covered overall along the sliding section.

BRIEF DESCRIPTION OF THE SEVERAL VIEWS OF THE DRAWING

Preferred exemplary embodiments of the invention are explained in more detail below with the aid of the figures, in which.

DESCRIPTION OF THE INVENTION

Figure 1:
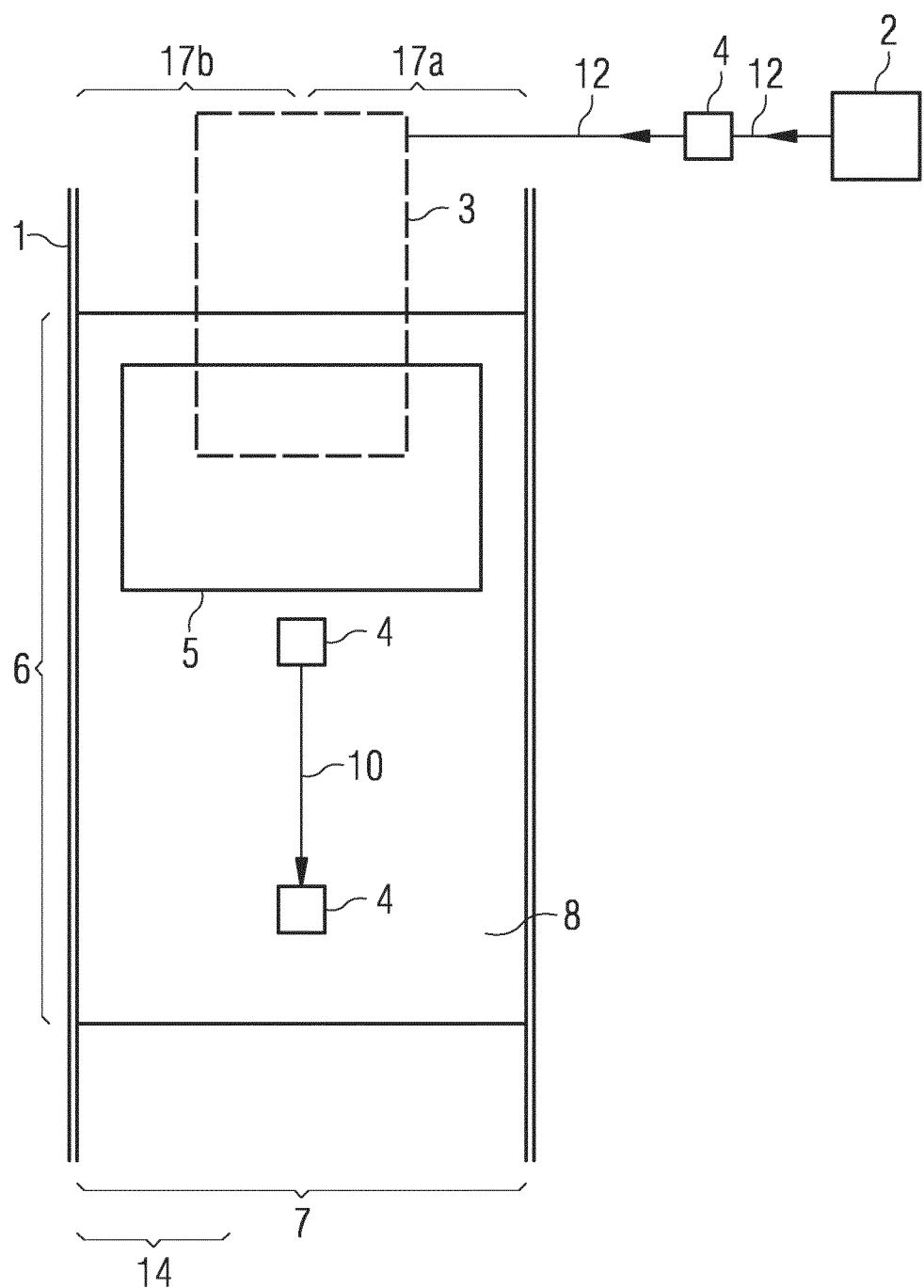
FIG. 1 shows a conveyor chute with at least one sliding section according to a preferred exemplary embodiment of the invention.

According to a preferred exemplary embodiment of the invention, FIG. 1 shows a conveyor chute 1, which is suitable for use as a store for goods 4, in particular for packages and pieces of luggage. The conveyor chute 1 comprises at least one sliding section 6. The sliding section 6 has an inclined sliding surface 8 with a direction of fall 10 along the sliding surface 8. The conveyor chute 1 has a sliding width 7. The sliding section comprises a width distribution apparatus 5, with which the goods 4 can be distributed across at least one part of the sliding width 7. The width distribution apparatus 5 thus permits an improved utilization of the conveyor chute 1 for storing the goods 4. The width distribution apparatus 5 is integrated into the sliding surface 8. The goods 4 have a direction of movement 12 coming from a sorting system 2, which in most cases does not match with the direction of fall 10. The goods 4 are unloaded into the conveyor chute 1 with the aid of an unloading apparatus 3. Since the goods 4 are not necessarily completely stopped by the unloading apparatus 3, on account of their inertia they accumulate on a collection side 14, which is located in the direction of movement 12 of the goods 4 prior to unloading. If the sorting system 2 is located on the right side 17a of the sliding section 6, the collection side 14 rests on the left side 17b of the sliding section 6. The unloading apparatus 3 can be arranged in the upper area or above the sliding section 6.

Figure 2:
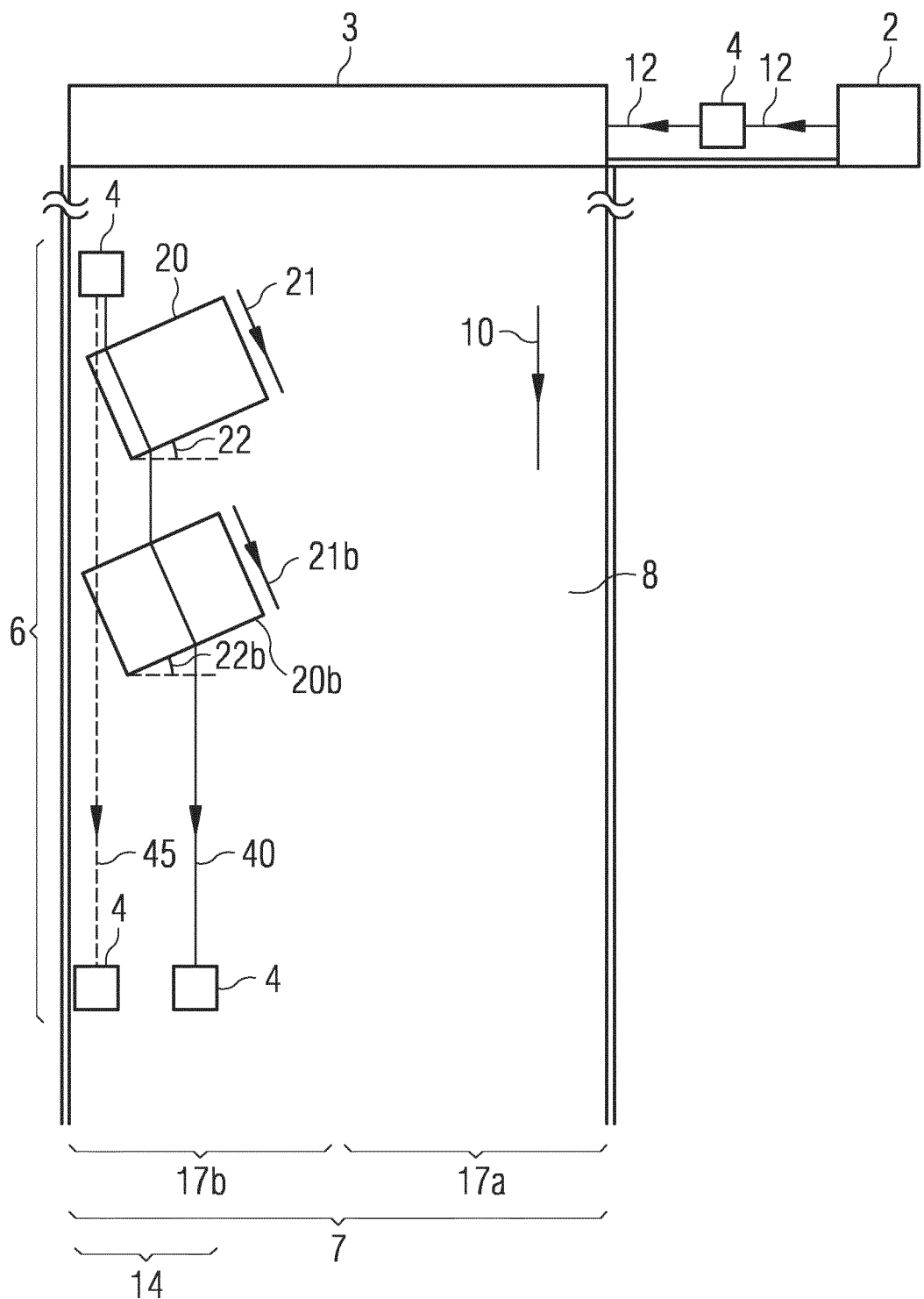
FIG. 2 shows a variant of the conveyor chute shown in FIG. 1 with a path or a hypothetical path of a goods item with or without an interaction with drive means after unloading in an upper left area of the sliding section.

FIG. 2 shows a variant of the sliding section 6 shown in FIG. 1. The width distribution apparatus 5 comprises two drive means 20 and 20b for transporting the goods. The drive means 20 and 20b have directions of transport 21 and 21b which do not match with the direction of fall 10. The sections of the drive means 20, 20b have tilt angles 22, 22b which are defined relative to the normal of the direction of fall 10 and which determine the directions of transport 21, 21b. The second drive means 20b is arranged in a section along the sliding surface below a section of the drive means 20. Without interacting with the drive means 20, 20b, a goods item 4 would cover a hypothetical path 45 along the sliding surface 8 uninfluenced by the at least one drive means 20. Actually, however, the goods item 4 covers a path 40 which is influenced by the drive means 20 and 20b. The goods item 4 firstly moves approximately in the direction of fall 10 and is transported by interaction with the drive means 20 along its direction of transport 21. The goods item 4 then moves further approximately in the direction of fall 10, until it strikes the second drive means 20b, interacts in turn herewith and is thus transported along its direction of transport 21b. After passing through the second drive means 20b, the goods item 4 moves further in the direction of fall 10. By interaction with the drive means 20 and 20b, the goods item 4 is located clearly further away from the collection side 14 than when passing through the hypothetical path 45.

Figure 3:
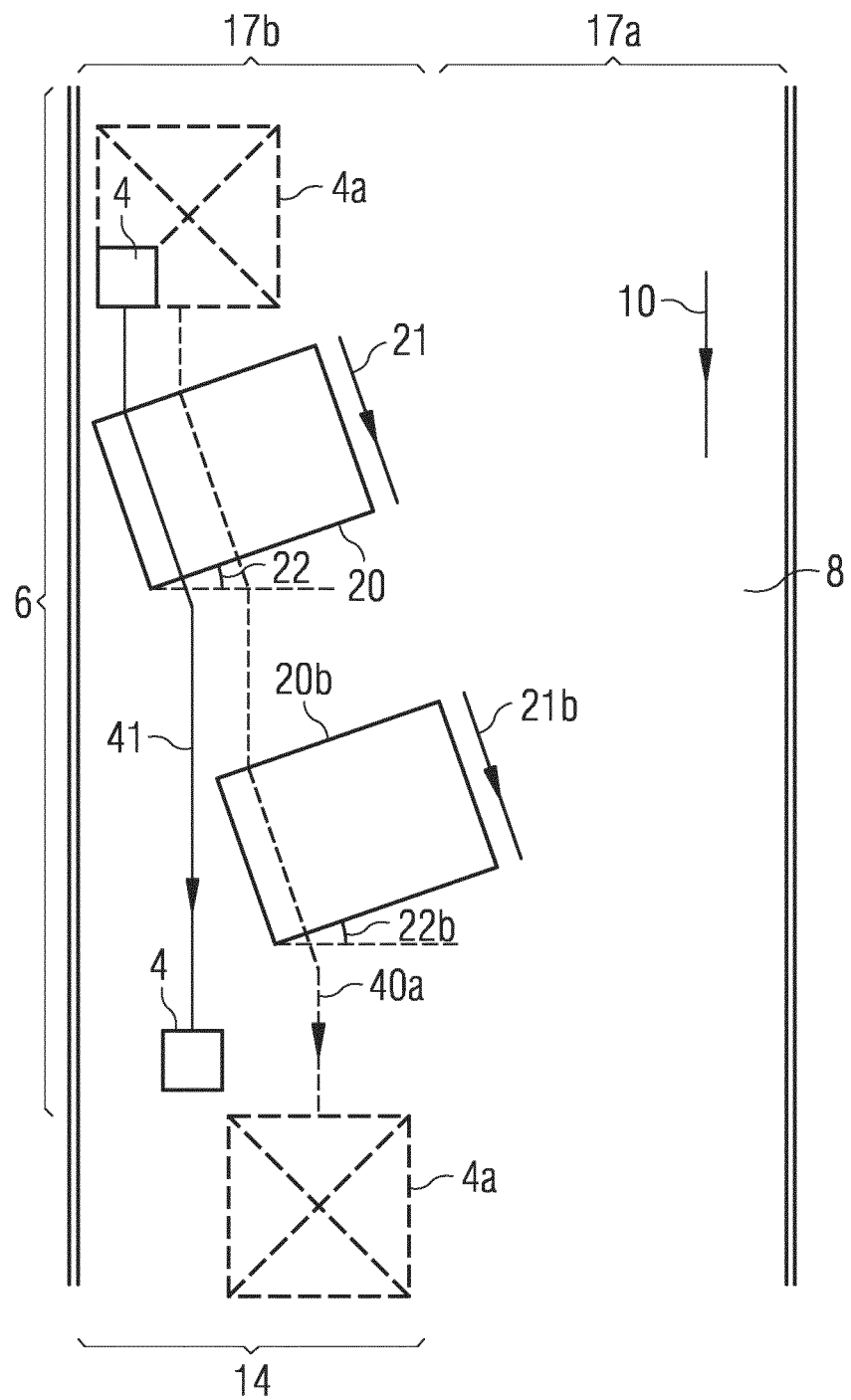
FIG. 3 shows a further variant of the conveyor chute shown in FIG. 1 with paths for differently sized goods along the sliding section when the drive means is arranged along the direction of fall and offset along the sliding width.

FIG. 3 shows a further variant of the sliding section 6 shown in FIG. 1. The drive means 20 and 20b are arranged along the direction of fall 10 and offset along the sliding width 7, wherein the drive means 20 is located closer to the collection side 14. The width distribution apparatus 5 does not cover the entire surface of the sliding section 6. Overall the goods item 4 covers a path 41 which is influenced by the drive means 20 and a large goods item 4a covers a path 40a which is influenced by the drive means 20 and 20b. Both goods items 4 and 4a are located firstly in the upper area of the collection side 14 and move in the direction of fall 10, pass through the drive means 20, are deflected in its direction of transport 21 and move further in the direction of fall 10. While, on account of its smaller dimensions, the goods item 4 does not pass through the second drive means 20b on its path 41, the large goods item 4a is also deflected by the second drive means 20b along its direction of transport 21b. Both goods items 4 and 4a are transported from the collection side 14 toward the right side 17a, but the large goods item 4a assumes a final position which is further away from the collection side 14 than that of the large goods item 4a.

Figure 4:
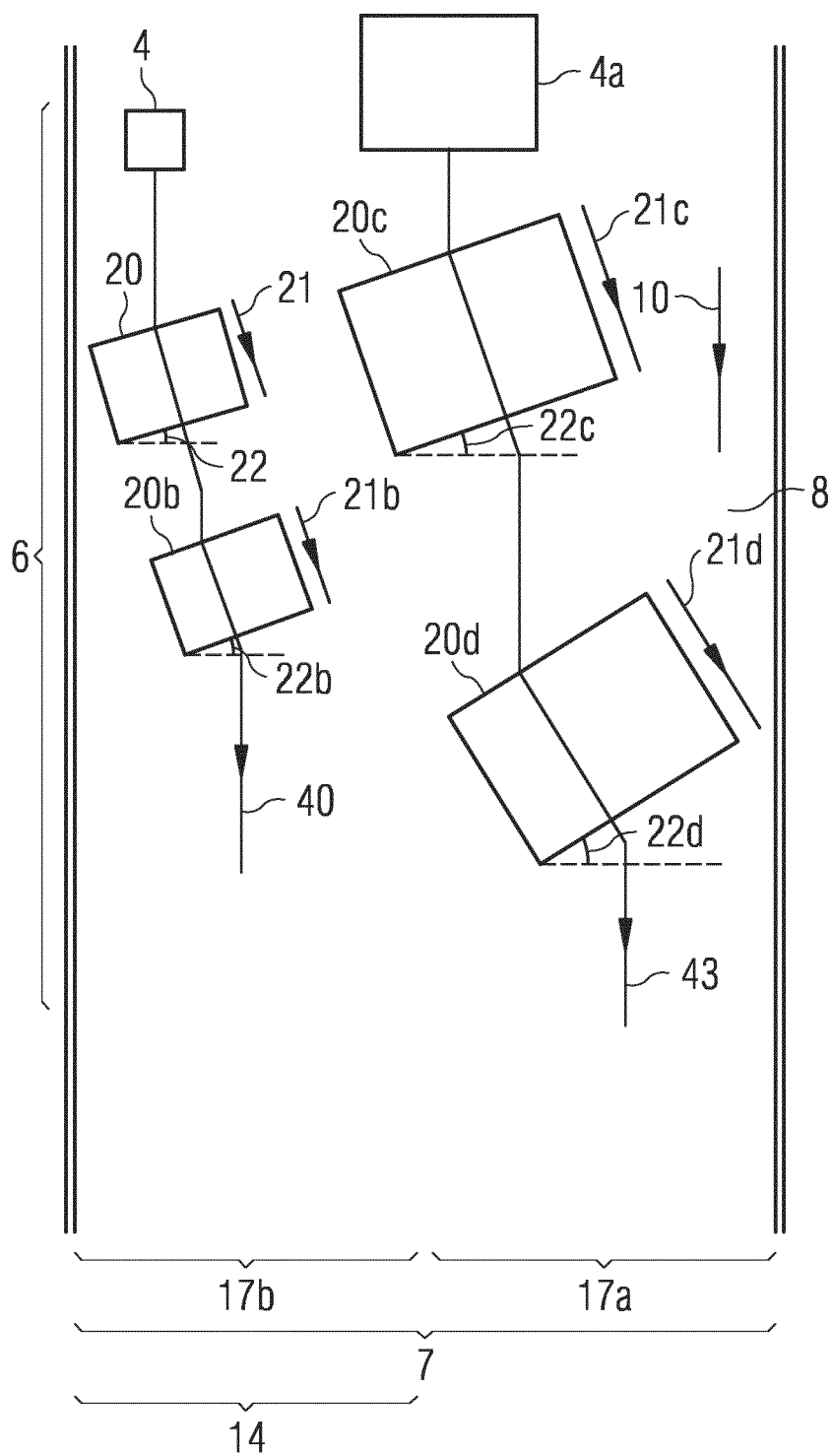
FIG. 4 shows a further variant of the conveyor chute shown in FIG. 1 with paths for goods along the sliding section when interacting with, in each case, two drive means arranged at different positions of the sliding section.

FIG. 4 shows a further variant of the sliding section 6 shown in FIG. 1. The drive means 20, 20b, 20c, 20d are arranged both along the sliding width 7, and also along the direction of fall 10. The drive means 20 and 20b are located closer to the collection side 14 and have a smaller width than the drive means 20c and 20d. The sections of the drive means 20, 20b, 20c, 20d have different directions of transport 21, 21b, 21c, 21d. Similarly to the situation described in FIG. 3, small goods items 4 preferably accumulate on a left side 17b of the sliding section 6 on account of an arrangement along the direction of fall 10 and offset along the conveyor width 7, while large goods items 4b preferably collect on a right side 17a. The different width of the drive means 20, 20b and 20c, 20d further reinforces this. After interacting with the drive means 20 and 20b, a small goods item 4 covers the path 40, while after interacting with the drive means 20c and 20d the large goods item 4a covers the path 43. The large goods item 4a is located in the upper region of the sliding section already further away from the collection side 14 than the small goods item 4. This initial situation can be achieved for instance by a sliding section 6 arranged above the sliding section 6, as shown in FIG. 3.

Figure 5:
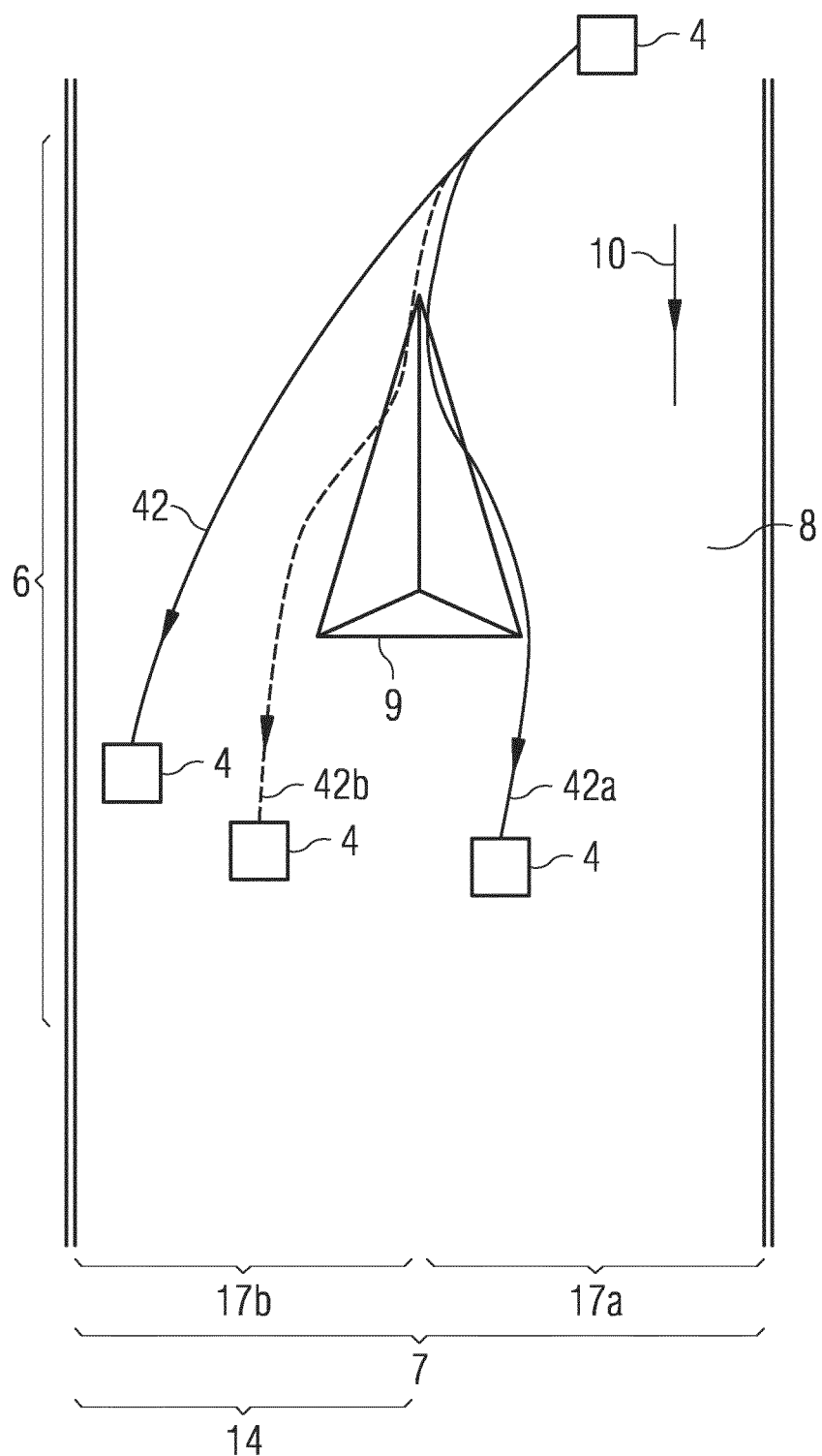
FIG. 5 shows a further variant of the conveyor chute shown in FIG. 1 with paths of goods along the sliding section, wherein two of the paths are designed by a distribution apparatus.

FIG. 5 shows a further variant of the exemplary embodiment of the sliding section 6 which is shown in FIG. 1. The width distribution apparatus 5 comprises a distribution apparatus 9 which is arranged in the upper area of the sliding section 6. The distribution apparatus 9 permits the goods 4 to be distributed on the right side 17a and/or left side 17b of the sliding section 6. Slight variations in the dimensions and size of the goods 4 result in a slight path variation, so that the goods can easily strike the distribution apparatus 9 on their way 42 along the sliding section 6. As a result, the goods 4 cover a path 42b or 42a influenced by one side of the distribution apparatus 9, which lies on the left side 17b or right side 17a of the sliding section 6. The distribution apparatus 9 can be a conical part or a pyramid with a triangular base surface for instance, the tip of which is arranged in the upper area of the sliding surface 8. The tip itself is therefore located at the same height as the sliding surface 8. The distribution apparatus 9 rises continuously away from the sliding surface 8 along the direction of fall 10.

Figure 6:
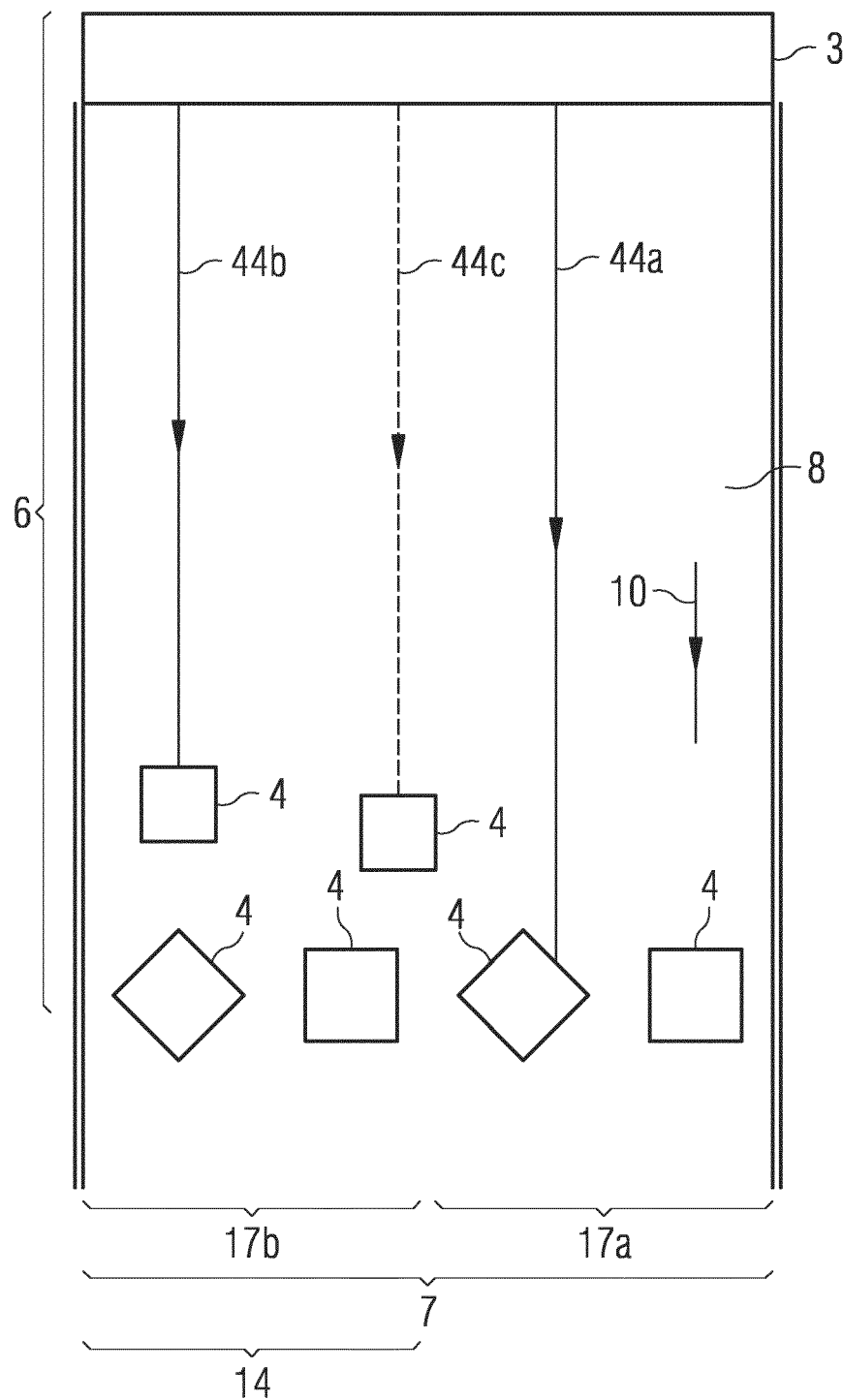
FIG. 6 shows a further variant of the conveyor chute shown in FIG. 1 with paths of goods along the sliding section, wherein the goods are introduced with an unloading apparatus at different positions along the sliding width at the upper end of the sliding section.

FIG. 6 shows a further variant of the exemplary embodiment of the sliding section 6 which is shown in FIG. 1. The width distribution apparatus 5 comprises an unloading apparatus 3. The unloading apparatus 3 brings the goods 4 to different positions along the sliding width 7 at the upper end of the sliding section 6. After unloading, the goods 4 thus cover different paths 44a, 44b, 44c which lie essentially in parallel to one another along the sliding section 6. With path 44a or 44b, the unloading takes place on the upper right side 17a or left side 17b of the sliding section 6 and with path 44c approximately centrally in the upper area of the sliding section 6. The unloading apparatus 3 can comprise an electronically controlled carrier for instance, which is able to arbitrarily determine the carrier time. A controller of the carrier time can be regulated by way of at least one light barrier integrated in the unloading apparatus 3, which determines the carrier time on the basis of the position of the goods 4, or by way of a simple determination of the carrier time after a predeterminable time delay. The goods 4 can thus be distributed relatively evenly along the sliding width 7.

All variants, described in FIGS. 2 to 6, of the exemplary embodiment of the sliding section 6 shown in FIG. 1 can be combined in a conveyor chute 1.

The at least one drive means 20 is distributed across a number of sections, which are arranged offset along the sliding width 7. This results, in a design-related manner, in the at least one drive means 20 not covering the entire surface of the sliding section 6. Furthermore, the at least one drive means 20 is distributed across a number of sections which are arranged along the direction of fall 10. An offset arrangement solely along the direction of fall 10 is shown in FIG. 2. An offset arrangement both along the direction of fall 10 and also along the sliding width 7 is shown in FIGS. 3 and 4. An offset arrangement of the sections of the drive means 20, combined with different directions of transport 21 of the sections of the at least one drive means 20 is shown in FIG. 4. The sections can have different distances from one another. An advantageous embodiment comprises distances between sections which increase along the direction of fall 10. Distances between the sections which increase in the direction of fall from the collection side 14 produce a greater deflection of large goods 4a away from the collection side 14.

The drive means 20 can transport the goods 4 actively and/or by way of delivery drop. An active actuation of the drive means 20 can render control electronics necessary and requires a control motor, but nevertheless, also, if necessary, permits an increase in the transport speed of the goods 4. A transport of the goods 4 by way of delivery drop uses the weight of the goods 4 to drive the drive means 20 and thus to transport the goods. In the case of a roller conveyor, the drop delivery comprises gravity-type rollers for instance. The gravity-type rollers may comprise brake rollers, which keep the flow speed constant. An additional brake function can be integrated into the roller conveyor using various techniques, which comprise a brake motor, a friction brake or a centrifugal coupling for instance.

The drive means 20 comprises a roller conveyor and/or a conveyor belt. The drive means 20 is preferably constituted such that a small force transmission takes place on the goods 4, so that an efficient deflection in the direction of transport 21 of the drive means 20 can take place on the goods 4. For this purpose, the drive means 20 can be coated and/or rubber-coated and/or constituted such that it can be covered with plastic or other materials.

A method for storing goods 4 on a conveyor chute 1 is described. The conveyor chute 1 comprises a sliding section 6, which has an inclined sliding surface 8 with a direction of fall 10 along the sliding surface 8. The conveyor chute has a sliding width 7. The sliding section 6 comprises a width distribution apparatus 5, with which the goods 4 can be distributed by way of at least one part of the sliding width 7. The goods 4 are firstly unloaded in an unloading area of the sliding section 4. The goods accumulate on a collection side 14 of the sliding section 6 without any influence from the width distribution apparatus 5. Subsequently an interaction takes place between the goods 4 and the width distribution apparatus 5. As a result, the goods 4 are distributed better across the entire conveyor chute 1.

Prior to unloading the goods 4 have a direction of movement 12 which does not match with the direction of fall. As a result, the paths of the goods 4 along the sliding section 6 are influenced both by the direction of movement 12, and also by the direction of fall 10.

A collection of the goods 4 on the collection side 14 takes place on account of their inertia and their direction of movement 12 prior to unloading. Therefore, the paths of goods 4 along the sliding section 6 can be influenced both by their inertia and also by their direction of movement 12 prior to unloading.

A transverse inclination of the sliding surface 8 can likewise distribute the goods 4 along the sliding width 7 and thus achieve an improved width distribution. With the present invention, this can however also be achieved without transverse inclination. Furthermore, the width distribution of the goods 4 can be influenced as a function of their dimensions, weight and/or speed.

Some exemplary embodiments of the invention use the situation in that in an inclined plane goods 4 can move gravity-type rollers on account of the dead weight. On account of the friction between the roller conveyor and the goods item 4, the further movement of the goods 4 is deflected by the rollers. If these rollers in a conveyor chute 1 are now installed with a tilt angle 22 so that the goods 4 are moved away from the collection side 14, a considerably better width distribution is thus formed. It is crucial that the roller conveyor is inclined or the tilt angle 22 is adjusted so that the goods 4 are drawn away from the collection side 14 due to the force of gravity.

According to one exemplary embodiment, the width distribution of the goods 4 on the conveyor chute 1 is increased by a simple structural measure. Installation of drive means 20 into the chute surface 8, which do not cover the entire sliding section 6 and which have a tilt angle 21, provides that goods 4 are drawn away from the collection side 14 due to their weight force. In terms of design, tilt angles 22 between 5° and 45° are preferred embodiments, other tilt angles 22 can also be realized however.

The conveyor chute 1 can be used in package sorting systems in logistics companies and in baggage sorting systems in airports, for instance. Accordingly, the sorting system 2 comprises different embodiments such as crossbelt, tilt tray, shoe, pusher or pop-up sorters for instance.

According to one exemplary embodiment, the storage capacity of the conveyor chute 1 can be increased without increasing its surface requirement.

LIST OF REFERENCE SIGNS

1 Conveyor chute
2 Sorting system
3 Unloading apparatus
4 Goods item
4*a* Large goods item
5 Width distribution apparatus
6 Sliding section
7 Sliding width
8 Sliding surface
9 Distribution apparatus
10 Direction of fall
12 Direction of movement
14 Collection side
17*a* Right side of the sliding section 6
17*b* Left side of the sliding section 6
20 Drive means
20*b* Second drive means
20*c* Third drive means
20*d* Fourth drive means
21 Direction of transport of the drive means 20
21*b* Direction of transport of the second drive means 20*b*
21*c* Direction of transport of the third drive means 20*c*
21*d* Direction of transport of the fourth drive means 20*d*
22 Tilt angle of the drive means 20
22*b* Tilt angle of the second drive means 20*b*
22*c* Tilt angle of the third drive means 20*c*
22*d* Tilt angle of the fourth drive means 20*d*
40 Path influenced by the drive means 20 and 20*b*
40*a* Path of the large goods item 4*a* influenced by the drive means 20 and 20*b*
41 Path influenced by the drive means 20
42 Path uninfluenced by the distribution apparatus 9
42*a* Path influenced by a side of the distribution apparatus 9, which is located on the right side 17*a* of the sliding section 6
42*b* Path influenced by a side of the distribution apparatus 9, which is located on the left side 17*b* of the sliding section 6
44*a* Path after unloading on the upper right side 17*a* of the sliding section 6
44*b* Path after unloading on the upper left side 17*b* of the sliding section 6
44*c* Path after unloading approximately centrally in the upper area of the sliding section 6
45 Hypothetical path uninfluenced by the at least one drive means 20

The invention claimed is:

1. A conveyor chute for storing goods, comprising:
at least one sliding section formed with an inclined sliding surface having a direction of fall along said sliding surface, said sliding section defining a sliding width of the conveyor chute;
said sliding section having a width distribution apparatus configured to cause the goods to be distributed across at least one part of the sliding width and to enable an improved utilization of the conveyor chute for storing goods, said width distribution apparatus including at least one drive device for transporting the goods, said at least one drive device having a direction of transport that does not coincide with the direction of fall.

2. The conveyor chute according to claim 1, configured for goods being packages and pieces of luggage.

3. The conveyor chute according to claim 1, wherein said width distribution apparatus is integrated into said sliding surface.

4. The conveyor chute according to claim 1, wherein said width distribution apparatus does not cover an entire surface of said sliding section.

5. The conveyor chute according to claim 1, wherein said at least one drive device is distributed across a plurality of sections that are disposed with an offset along the sliding width.

6. The conveyor chute according to claim 1, wherein said at least one drive device is distributed across a plurality of sections that are arranged along the direction of fall.

7. The conveyor chute according to claim 1, wherein a plurality of sections of said at least one drive device have different directions of transport.

8. The conveyor chute according to claim 1, wherein said width distribution apparatus comprises an unloading apparatus configured to introduce the goods at different positions along the sliding width at an upper end of said sliding section.

9. The conveyor chute according to claim 1, wherein said width distribution apparatus comprises a distribution apparatus arranged in an upper region of said sliding section, and wherein said distribution apparatus enables a distribution of the goods on a right side and/or on a left side of said sliding section.

10. The conveyor chute according to claim 1, wherein said drive device is configured to transport the goods actively and/or by way of drop delivery.

11. The conveyor chute according to claim 1, wherein said drive device comprises at least one device selected from the group consisting of a roller conveyor and a conveyor belt.

12. A method for storing goods on a conveyor chute, the conveyor chute having a sliding section formed with an inclined sliding surface having a direction of fall along the sliding surface, and the conveyor chute having a sliding width, the method comprising:
providing the sliding section with a width distribution apparatus configured to distribute the goods across at least one part of the sliding width of the conveyor chute;
unloading the goods in an unloading area of the sliding section, wherein the goods would accumulate on a collection side of the sliding section without influence from the width distribution apparatus; and distributing the goods by an interaction between a drive device of the width distribution apparatus and the goods.

13. The method according to claim 12, which comprises, prior to unloading the goods, moving the goods with a direction of movement that does not match with the direction of fall.

14. The method according to claim 12, wherein, prior to unloading, the goods collect on the collection side on account of their inertia and their direction of movement.

* * * * *